(12) United States Patent
Cripps

(10) Patent No.: US 7,802,942 B2
(45) Date of Patent: *Sep. 28, 2010

(54) WASTE WATER ELECTRICAL POWER GENERATING SYSTEM

(76) Inventor: Jeffrey L. Cripps, 2843 Orange Grove, Waterford, MI (US) 48329

( * ) Notice: Subject to any disclaimer, the term of this patent is extended or adjusted under 35 U.S.C. 154(b) by 46 days.

This patent is subject to a terminal disclaimer.

(21) Appl. No.: 12/254,659

(22) Filed: Oct. 20, 2008

(65) Prior Publication Data

US 2009/0179427 A1 Jul. 16, 2009

Related U.S. Application Data

(63) Continuation of application No. 11/842,703, filed on Aug. 21, 2007, now Pat. No. 7,452,160, which is a continuation of application No. 11/201,074, filed on Aug. 10, 2005, now Pat. No. 7,357,599.

(51) Int. Cl.
 *E02B 9/00* (2006.01)
(52) U.S. Cl. .............................. 405/75; 290/1 R; 290/43
(58) Field of Classification Search .................. 405/75, 405/76, 77, 78; 290/42, 43, 53, 54, 1 R
 See application file for complete search history.

(56) References Cited

U.S. PATENT DOCUMENTS

| 2,962,599 | A | * | 11/1960 | Pirkey | 290/54 |
|---|---|---|---|---|---|
| 3,372,645 | A | * | 3/1968 | Willi | 290/52 |
| 4,010,614 | A | * | 3/1977 | Arthur | 60/641.15 |
| 4,109,160 | A | * | 8/1978 | Goto et al. | 290/52 |
| 4,284,900 | A | * | 8/1981 | Botts | 290/43 |
| 4,307,299 | A | * | 12/1981 | Norton | 290/52 |
| 4,443,707 | A | * | 4/1984 | Scieri et al. | 290/4 R |
| 6,216,463 | B1 | * | 4/2001 | Stewart | 60/641.2 |
| 6,862,886 | B2 | * | 3/2005 | Stewart | 60/641.2 |
| 7,153,060 | B1 | * | 12/2006 | Bennion | 405/75 |
| 7,429,803 | B2 | | 9/2008 | Davis | |
| 7,452,160 | B2 | * | 11/2008 | Cripps | 405/75 |
| 7,632,040 | B2 | * | 12/2009 | Cripps | 405/75 |
| 2005/0034452 | A1 | * | 2/2005 | Davis | 60/398 |

* cited by examiner

*Primary Examiner*—Frederick L Lagman
(74) *Attorney, Agent, or Firm*—Garlick Harrison & Markison; Bruce E. Stuckman

(57) ABSTRACT

An environmental protective electrical power generating system is formed by a penstock connected at its opposite ends to a large sewer for conveying waste water from feeder pipelines to a sanitary treatment station. Sewer waste water is propelled through the sewer line by pumping equipment which simultaneously pulverizes most large objects carried by the waste water. The waste water is diverted, through a control gate, into the penstock where it flows through and operates one or more water-operated turbines. The turbines are operatively connected to electrical power generators for producing electrical power and dispersing the power through an electrical power transmission system. Depending upon the size of the sewer pipes, the volume of liquid flowing there-through, and the turbine and generator equipment, electrical power is generated without affecting the environment or ecology and without the use of fossil fuels.

13 Claims, 4 Drawing Sheets

WASTE WATER ELECTRICAL POWER GENERATING SYSTEM

CROSS REFERENCE TO RELATED APPLICATIONS

This application claims priority under 35 U.S.C. 120 as a continuation of U.S. application Ser. No. 11/842,703, filed on Aug. 21, 2007 now U.S. Pat. No. 7,452,160 that itself is a continuation of U.S. application Ser. No. 11/201,074, filed on Aug. 10, 2005, now U.S. Pat. No. 7,357,599 entitled, "Waste Water Electrical Power Generating System."

BACKGROUND OF INVENTION

This invention relates to an improved system for generating electrical power utilizing sewer waste liquid as the energy source for operating turbines which, in turn, drive electrical power generators.

Conventional electrical power generating systems which use fossil and non-fossil fuels have adverse affects on the environment. For example, electrical power-generating systems that utilize fossil fuels, such as coal or oil, produce residual materials which pollute the atmosphere. Those pollutants result from the burning of fossil fuels to generate heat to produce steam which operates turbines that drive electrical power-producing generators. Other electrical power-generating systems which utilize atomic energy to produce steam cause radiation problems and problems in the disposal of spent, radioactive, fuel. Hydro-electric power systems require expensive and elaborate structures, such as dams, which block rivers, and water storage ponds or lakes, which adversely impact the environment. Wind-operated systems, which use numerous windmills, are not practical in many places because they require large areas and steady winds. Also they are unsightly. In general they are limited to areas that have sufficient, consistent wind velocity and wind strength. Hence, efforts have been made to develop systems for generating electricity which eliminate or minimize the disturbance of the environment and the high expenses and ecological problems associated with conventional power-generating systems.

The invention herein is concerned with providing the "fuel" or energy source for operating electrical generators on a consistent basis using the flow of sewer waste liquid which is available in highly populated areas. In a typical, substantial size city or suburban area, sewage water waste discharged from homes, commercial buildings and other structures, is initially conveyed through feeder sewer pipes. These feeder pipes ultimately drain into main or large sewer pipelines. These pipelines normally carry the waste liquid to treatment plants or to other locations for disposal. Commonly, all of the pipes and pipelines are buried so that they are out of sight.

In relatively large towns and cities and densely populated suburban areas, the discharge flow of waste sewer water is substantially consistent during most of the hours of a typical day. Thus, there is a fairly constant flow of liquid in large mains or interceptor sewer pipelines each day. Consequently, this invention contemplates utilizing that waste water flow before treatment of, and before final disposal of, the sewerage liquid for operating turbines or water wheels. Those hydraulically-powered turbines or wheels drive electrical power generators during times when the electrical power is needed.

The power generated by the use of waste water can be used as auxiliary or supplemental power supply sources for established power-generating systems. Thus, the supplemental power is particularly useful during peak times when extra power is demanded from established or local electrical power-generating installations. Peak power use times generally coincide with peak flow in sewer lines. Alternatively, sewer waste liquid flow may fuel a local electrical generating installation where the electrical energy produced by such an installation is enough to meet local demands.

By utilizing the energy of the flowing sewer waste water or liquid, which is available in installed sewer pipelines, electricity can be generated to augment or supplement a local or established power-generating system without substantially affecting the local environment or the ecology of the local area in which the system is installed. And, the "fuel," that is, the flowing sewer waste liquid which is otherwise totally wasted, is captured to provide a replacement for other forms of fuel which do affect the environment and local ecology.

SUMMARY OF INVENTION

The invention herein contemplates an economical way to produce electrical energy without adversely impacting the environment, without utilizing fossil fuels, and without the need to construct large structures such as dams or water retention lakes, and the like. Thus, the method and apparatus involved in the present system for generating electrical power is based upon using a waste material, namely waste sewage water or liquid, which otherwise is unused and is normally discarded. The supply of waste sewage water is readily available in already existing sewage pipes located in or near populated areas which produce, on a daily basis, large quantities of sewage.

Conventionally, sewage waste liquid is collected from buildings and other structures or commercial and industrial enterprises and is discharged through underground sewer lines into larger conduits or pipes. In a relatively large, heavily populated area, local sewer pipes, in turn, feed into successively larger sewer pipelines. Ultimately the liquid is passed into one or more large main pipelines which convey the liquid to waste treatment installations or to dump locations. In most settled areas, the larger or main pipelines may be of a diameter that varies from approximately three feet up to ten feet or more. These pipelines, for example, may convey a flow of sewage liquid in the range of 8-10 feet per second for 15 to 20 hours of a day. While the volume a liquid may vary considerably, depending upon the diameter and location of the pipeline and the network of sewer pipes that feed liquid into larger or main pipes, the amount of sewage liquid is considerable and is fairly consistent.

While sewage waste liquid usually includes solid materials, in many installations, the solid materials are pulverized or ground up in the course of the flow of fluid through main pipelines. Thus, these fluids may be of a consistency or viscosity that is close to that of clear water.

It is contemplated here to provide a diversion pipeline, which can be referred to as a "penstock," to divert from a large main or interceptor sewer pipeline at least part of the flow of liquid which travels through the sewer pipeline. The diverted flow of sewage liquid powers hydraulically operated turbines or water wheels that are arranged in the penstock flow. These are operatively connected to, and provide the force needed to, drive conventional electrical power generators. The number of generators and the number of turbines or water wheels that are operated by the flowing, diverted, waste water flow, can vary.

After the waste water or liquid passes the turbines or water wheels, it continues through the penstock conduit back to the sewage pipeline. Thus, the diverted waste sewage flow merges into the flow of the sewage liquid in the pipeline and continues on towards its ultimate destination. That destination, typically, is a sewage treatment plant for processing the sewage by removing sludge, solid particles and impurities so that the treated water is sufficiently clean for recycling.

The amount of electricity generated can be varied, for example, in order to provide sufficient electrical power to augment or supplement a conventional electrical power-generating system of a particular community or area. Thus, this system can be operated during peak hours of the use of electrical power and either shut down or reduced in power output during peak hours. This system may be able to meet a community's power demands, providing a clean service of electrical power.

As contrasted with hydraulically-operated electrical power-generating facilities, the present system does not need dams or holding ponds or lakes to provide a steady supply of water to operate the system. Nor does it affect the operation of the conventional sewage disposal system with which it is associated. Also, the flow of sewage water, although varying at different times, is relatively consistent in volume. And the sewage normally flows throughout the year, regardless of ambient climate changes. In a typical populated area there is enough sewage water flow to reliably produce a pre-determined amount of electrical power that may be desired for supplementing the output of a local electrical power-generating system.

An object of this invention is to provide an electrical power-generating system which is fueled by a stream of flowing waste sewage liquid which otherwise would have been totally discarded. The system typically can be used during times of the day where heavy loads of electricity are required in a particular area or community. The peak times for heavy electrical loads closely parallel the times of high flow of waste sewage in a typical community. The equipment and the method for using sewage waste water as the energy source for the power-generating system simply diverts some portion of the regular flow of sewage without substantially affecting the regular flow. Consequently, the system can be turned on or off quickly, on short notice, for either supplying, or discontinuing supplying, electrical power without disrupting the sewage disposal system.

Another object of this invention is to provide an area or community with a relatively inexpensive system for supplying electrical energy without adversely impacting the environment or the local ecology and without utilizing fossil fuels such as coal or oil. Moreover, the system adds relatively little by way of structure to an existing sewer system so that the system would not be unsightly or unacceptable in many communities.

Yet another object of this invention is to provide a relatively easily and inexpensively constructed arrangement for diverting, when desired, a pre-determined amount of waste water flowing through a local sewer system, preferably through one of the main sewer lines which is of large diameter and has a relatively large normal flow, so as to utilize what would otherwise be wasted energy.

These and other objects and advantages of this invention will become apparent upon reading the following description, of which the attached drawings form a part.

DETAILED DESCRIPTION OF PREFERRED EMBODIMENT

Figure 1:
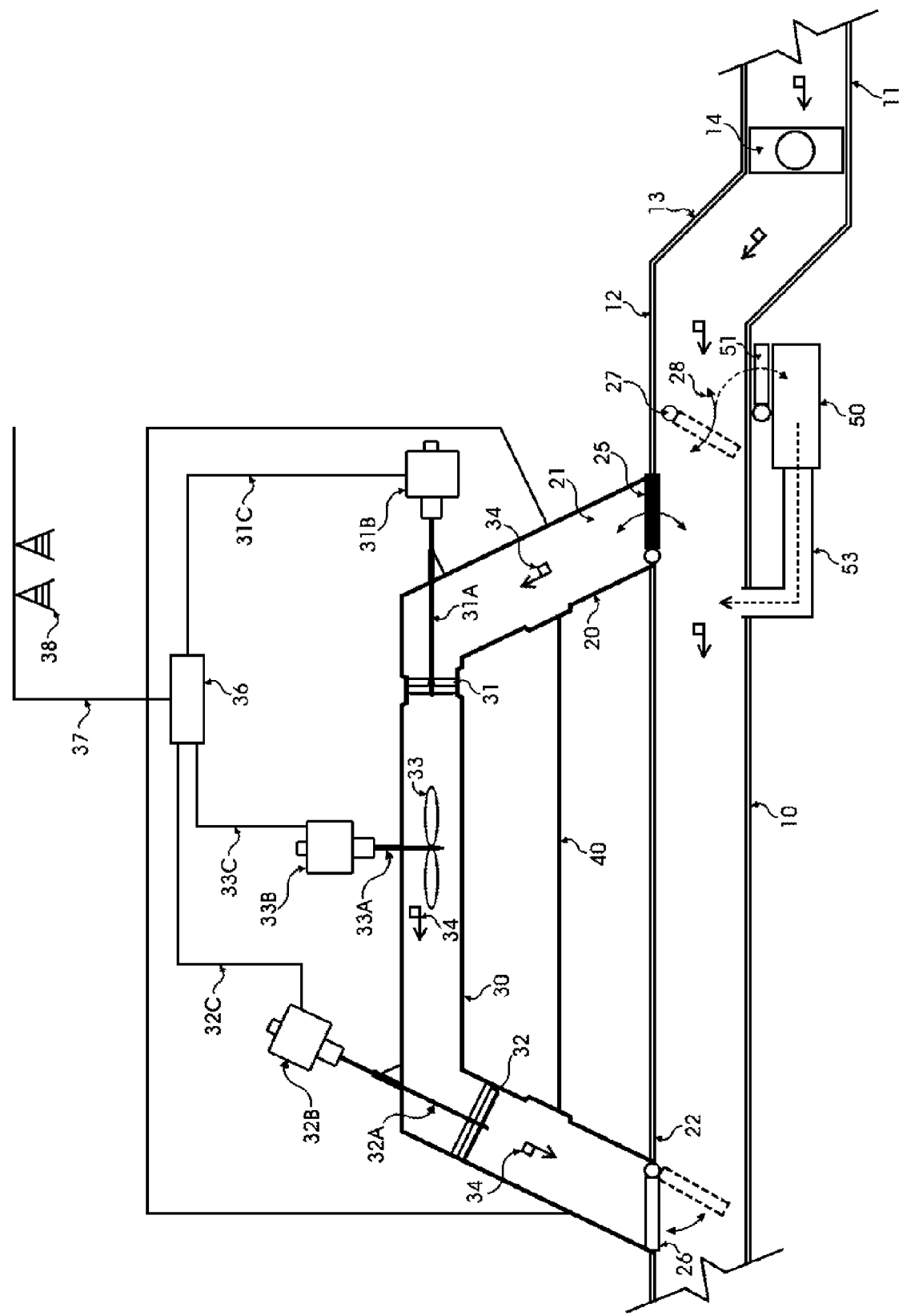
FIG. 1 schematically illustrates, in plan view, a system for diverting ordinary sewage waste liquid from a sewage pipeline and utilizing the fluid to operate turbines or water wheels which, in turn, drive conventional electrical power generators. The drawing schematically illustrates the connections between the elements forming the system including connections to the electrical distribution system of the area.

FIG. 1 schematically illustrates the system for generating electrical power using sewage waste water flow for the operating energy. The drawing schematically illustrates a conventional sanitary sewer main pipeline 10 through which liquid sewage is conveyed. Sewage may be fed into the pipeline 10 from smaller or lateral feeder pipes, not shown in the drawing. The arrangement and construction of the sewer large or main line and the feeder pipes are conventional.

In a conventional sewer pipeline, the pipe is sloped relative to the land so that fluid gravity flows along the length of the pipe. Since such pipelines are normally relatively long, and frequently the ground contours slope in different directions, it is customary to lay the pipeline in sections which start at a low point and slope upward to a high point. At the low point, the liquid in the pipe is sometimes raised by pumping equipment to the next high point of the pipe section where it begins its movement again.

FIG. 1 of the drawing schematically shows the lower end of a pipe section 11 connected to the upper end of the next pipe section 12 by an angled connection section 13. A conventional pump 14 lifts the flowing fluid upwardly through the connector section. Conventional pumping equipment typically includes pump impellors which lift the fluid upwardly to the high point of the next section and simultaneously grind up or pulverize most, if not all, of the solid materials contained in the water. Hence, over a relatively long length of sewer pipe where there would be a number of pumps to lift the fluid from the lower ends of sloped pipe sections to the higher ends of their adjacent pipe sections, almost all, if not all, solid materials are ground up or pulverized so that the sewage flow comprises a watery liquid closely similar in viscosity to the flow of clear water. Such solid materials as elude the grinding are captured and temporarily removed from the penstock as will be explained below.

A diverter pipeline 20, which may be referred to as a "penstock" or liquid conduit, has an inlet or intake end 21 connected to the pipe 10. The opposite end of the diverter pipeline 20 has an outlet 22 connected to the pipeline 10. An inlet gate 25 is pivotally or slidably connected at the inlet 21 and may be pivoted or slidably lifted into an open or closed position by any conventional apparatus, which, for example, can be conventional elongated rods having pistons arranged in hydraulically or pneumatically operated cylinders for moving the rods longitudinally. The rods may be connected to the gate 25 and the cylinders connected to a fixed support, so that extending and retracting the rods will swing or lift the gate into open and closed positions respectively. This is a conventional device commonly used for moving or swinging door-like or slide gate panels.

When the gate is in its closed position, as shown in the drawing, liquid flowing through the sewer line 10 bypasses the inlet gate and continues on its way through the pipeline. But, when the system is energized for producing electrical power, the inlet gate 25 is swung or lifted into the open position. At that point, liquid from the main sewer line is diverted into the penstock 20. The liquid flows through the penstock through the outlet 22 where an outlet gate 26 is opened to discharge the flow of liquid out of the penstock. When the outlet gate is open, liquid flows back into the sewer line. The volume of liquid flow through the penstock can be controlled by the movement of the gates into positions that control or regulate the amount of liquid passing into and out of the penstock. Turbine speed can also be controlled by adjustment of blade pitch.

Since there is a possibility that some solids may be in the fluid that reaches the inlet 21 of the penstock, a suitable inlet screen 27 may be provided. Different kinds of screens are commercially available for removing solid objects or large particles from flowing liquid. In this case, a suitable screen 27, as for example, may be formed of a series of spaced-apart, parallel bars arranged into a panel. The liquid passes between the bars, while the solid objects are retained. Other suitable screens may be selected by one skilled in the art from among those that are commercially available. The screens may be pivotally or slidably connected within the penstock 20 interceptors or main pipeline 10, as indicated by arrow 28, so as to be swung or lifted into a position for intercepting solid materials before they enter the penstock working area where turbines or water wheels are located.

The filtered or screened fluid that passes through the inlet screen 27 and through the penstock inlet end 21 flows through the penstock working area 30 and turbines. For illustration purposes, three turbines are illustrated as being in the path of the flowing liquid. These are turbine 31, at the inlet end of the working area; turbine 32, near the outlet end of the working area, and vertically axised turbine 33, which is horizontally arranged, to form a water wheel arrangement in the middle of the working area. The locations and number of turbines can vary.

The turbines are rotated by the flowing liquid which is indicated by arrows 34. When activated the turbines rotate their respective drive shafts 31*a*, 32*a*, and 33*a*. The drive shafts are connected to conventional electrical power generators 31*b*, 32*b*, and 33*b*.

The generators, in turn, are connected by electrical lines 36*c*, 32*c* and 33*c* to a conventional power distribution control system 36, which is schematically illustrated. The distribution system is connected by electrical lines 37 to power transmission lines which are schematically illustrated by tower-like symbols 38.

The sizes and capacities of the turbines, generators and distribution system may vary, depending upon the generating capacity designed into the system. Commercially available equipment can be used for these items. All of these items may be contained within a housing 40, of a size and shape to provide protection for the equipment and for minimal disturbance of the local area in which the equipment is positioned.

By way of examples of the operating capacities of the equipment, it is contemplated that a sanitary sewer main line of about 102" in diameter, with a liquid flow of about 8-10 feet per second, can generate in the neighborhood of 6.8 megawatts per hour of electrical power from a single conventional generator. The number of generators may be increased. For example, 10 generators connected to corresponding turbines located in the path of the penstock flow, might then produce about 60-70 megawatts per hour. That is approximately enough power for about 40,000 dwelling homes. This is based upon an anticipated average of about 25-30 kilowatt hours per day per house. Hence, a substantial amount of supplemental or auxiliary electrical power is provided. This generated electrical power can either entirely power a community or can be utilized during peak times, or such other times when outside electrical power is needed to supplement the output of a usual, electrical power-generating installation.

Since it is possible that some solid objects may be carried along in the flow or that some of the particles of ground-up objects are large enough to damage the turbine blades, the inlet screen 27 blocks the solids from traveling from the sewage pipe into the intake of the penstock. These solids can be caught by the screen and dumped into a catch basin 50 located above the screen and beneath an opening, that the pipe 10, that is normally closed by a hatch panel 51. As shown schematically by arrows 52, the solid materials are then carried back into the main sewage line, through a chute 53, downstream of the penstock intake end or alternatively may be otherwise removed from the catch basin.

Figure 2:
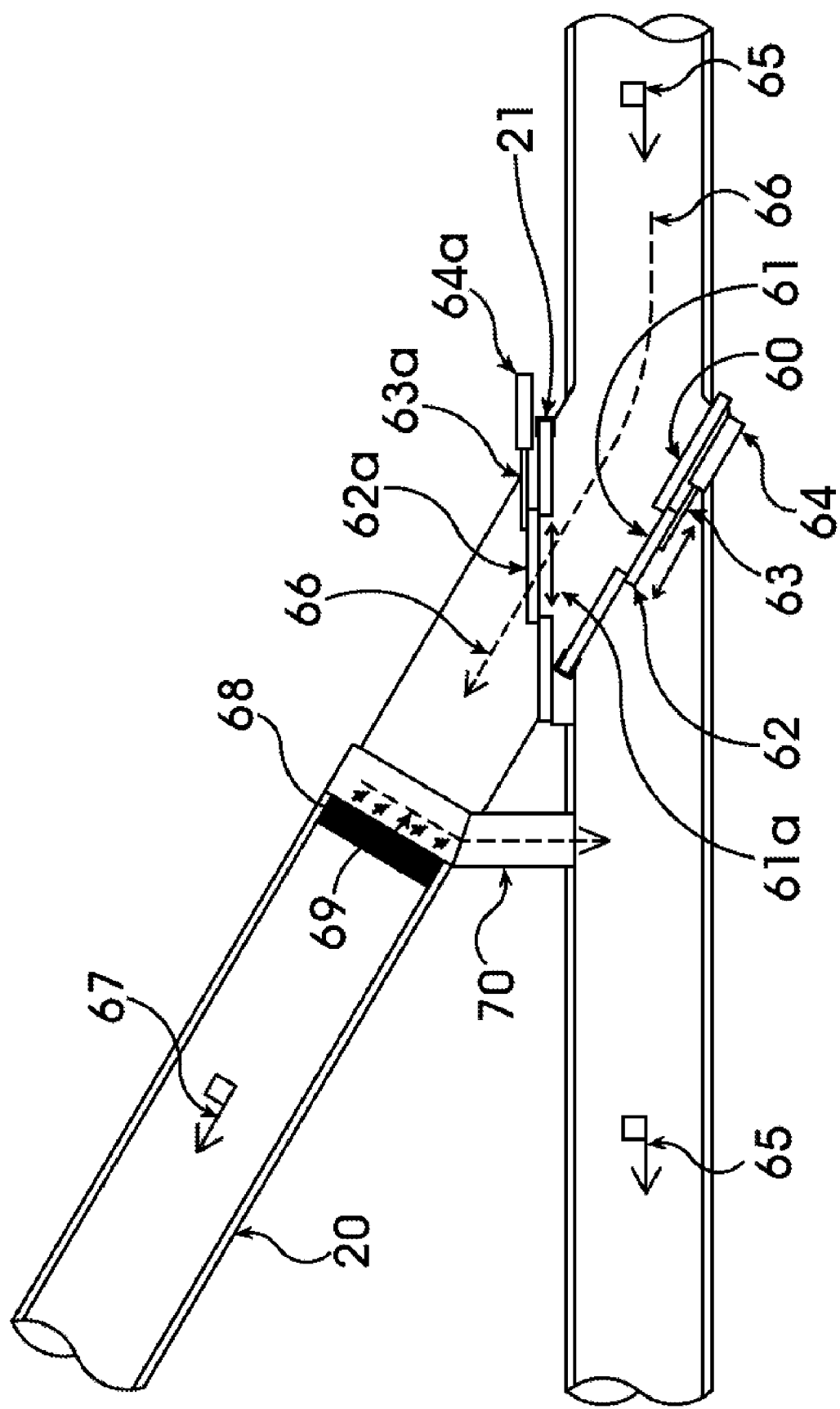
FIG. 2 schematically illustrates a modification of the inlet connection between the diversion pipe or penstock from the sewage pipeline, showing schematically a sliding or lift gate which diverts the flow and the screen system for diversion of solid materials from the entry to the turbines.
Figure 4:
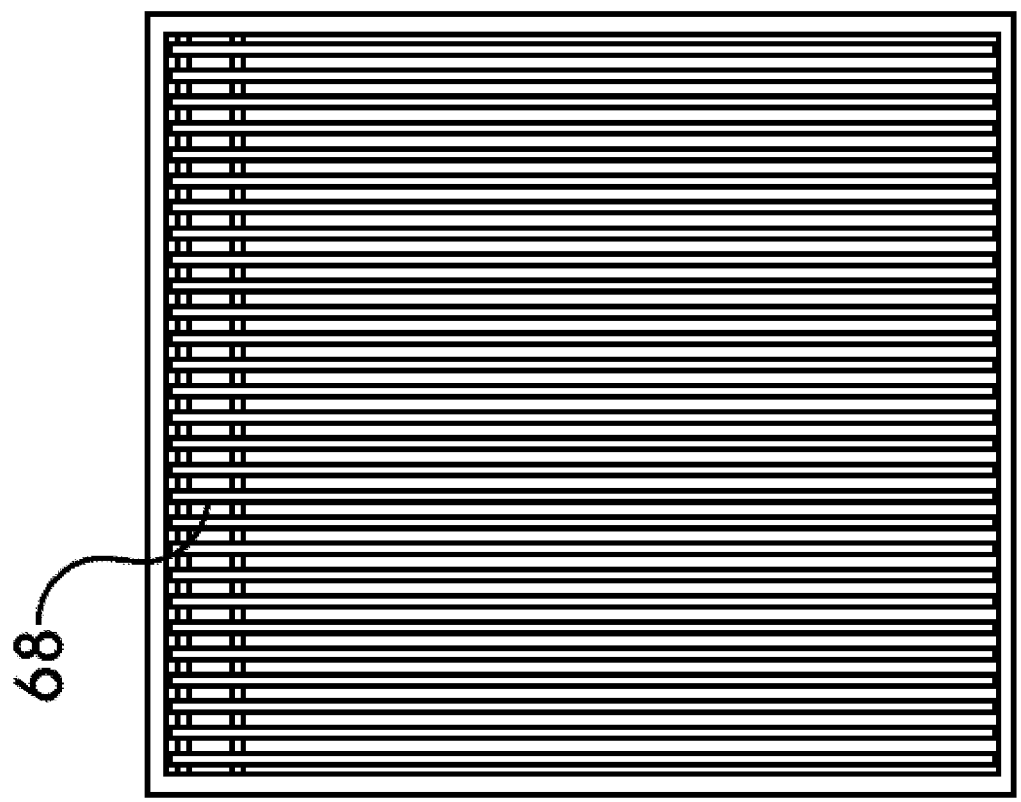
FIG. 4 schematically illustrates a front view of a type of screen for catching solid materials before entry into the diversion pipe or penstock.

FIGS. 2 and 4 illustrate a modification which includes slide or lift-type gates for controlling the flow of the sewage water into and through the penstock. Referring to these figures, the penstock or diversion pipe 20 is connected to the main sewage pipeline 10 at 21. A gate 60 is located in the main pipeline and has an opening 61 through which the sewage may pass. The opening, or the amount that the opening is uncovered, is controlled by a slide gate 62 which is moved to cover, partially uncover, or completely uncover the opening 61 by means of a hydraulic or pneumatic system including a piston rod 63 and a cylinder 64 which moves the piston rod endwise. Similarly, gate 60*a* may be positioned at the juncture 21 between the penstock and the sewage pipe. Optionally, both gates 60 and 60*a* may be installed. Gate 60*a* may include an opening 61*a* through which fluid is diverted into the penstock. The opening is covered by a slide or lift gate 62*a* which is moved by a piston rod 63*a* powered by a cylinder 64*a* to uncover the opening.

Once the sewage enters into the penstock, it passes through a screen 68, which may be formed of parallel bars or other suitable screening material for catching sold particles. The particles may be dropped or flushed into a catch basin 69 and then flushed through a connecting pipe 70 back to the main sewage line downstream of the connection 21 between the penstock and the sewer line. Arrows 65 illustrate the flow of the sewage through the main line and dotted arrows 67 indicate the flow of the diverted liquid through the penstock to the turbines (not shown).

Figure 3:
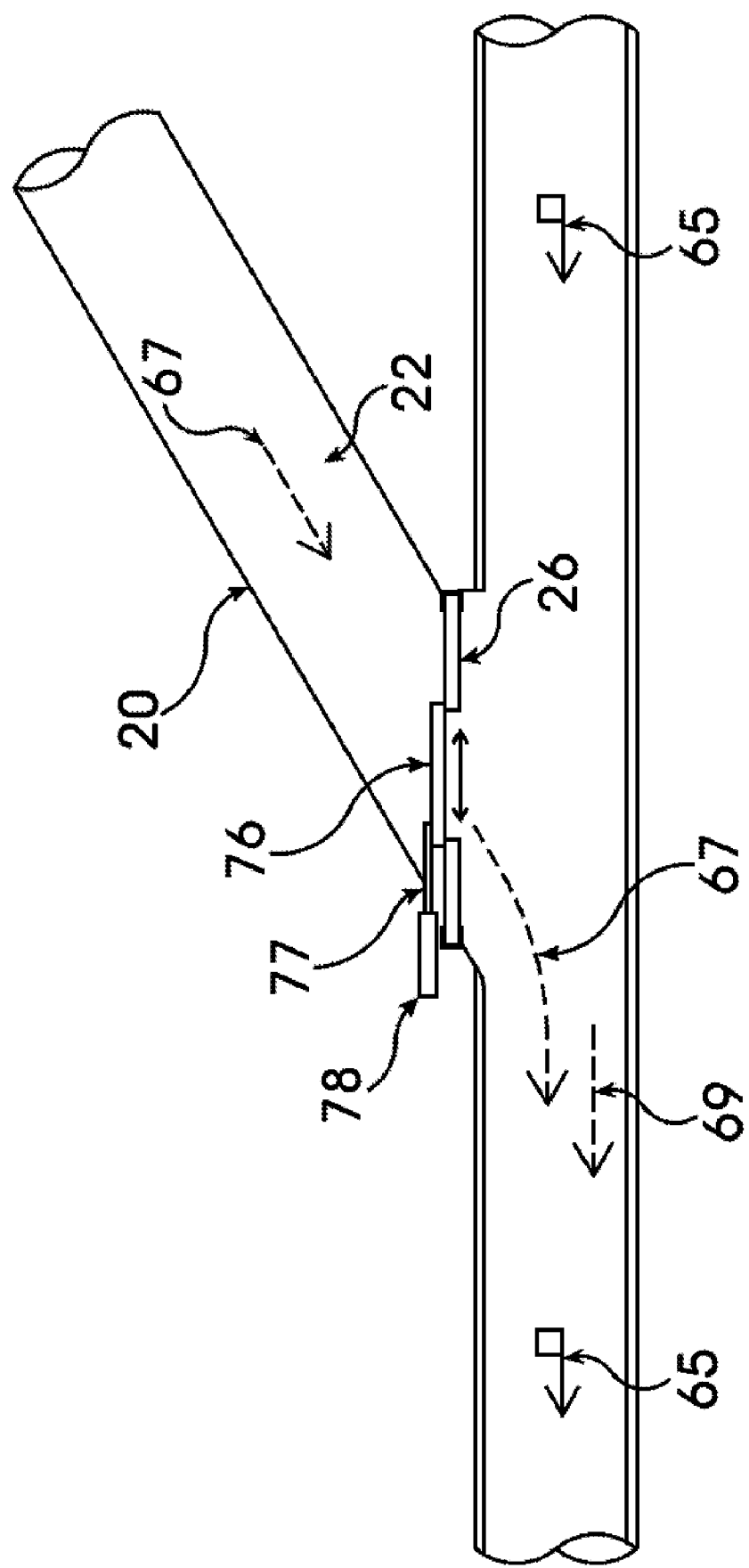
FIG. 3 schematically shows, in an enlarged view, the gate at the outlet end of the penstock or diversion pipe.

After the fluid passes and powers the turbines or water wheels, FIG. 3 schematically illustrates the return of the diverted fluid through a slide gate 76 connected to suitable piston rods 77 that are powered by hydraulic or pneumatic cylinders 78. Thus, the connection of the penstock to the main sewer line at 22 may be opened, partially opened, or completely opened, to control the outlet of fluid from the penstock.

FIGS. 2 and 3 are plan views, i.e., looking down, on the inlet and outlet portions, respectively, of the penstock. Thus, the slide gates may be moveable sideways or up and down, depending upon the desired design of the installation.

In water flows which are of high pressure or relatively high pressure, the use of slide gates to control the flow of water is common and, therefore, here, as in other water-controlled installations, the sizes and shapes of the openings and the gates and the equipment for moving the slide gates is known and those skilled in the art would be expected to design the size and shape and power required to operate the gates in accordance with the amount of flow anticipated.

To summarize, large diameter, such as main interceptor sewer lines typically carry large amounts of sewage liquid. As the sewage liquid flows through the line, it is periodically passed through pumping stations, to raise the level of the flow in order to implement downhill gravity flow. At the same time, the solid materials in the liquid are pulverized, leaving little, if any, solid objects. Then, when desired, a portion of that watery liquid flow is diverted into the penstock where it operates turbines. The term "turbines" includes water wheels or any other hydraulically-operated equipment used in electrical power-generating systems.

The turbines drive electrical power generators. The generated electricity is transmitted to power transmission equipment for transmission into the established power distribution system of the particular area involved. Hence, the fuel needed to generate the electrical power is provided by the waste water which otherwise would have been unused and discarded. As a result, the system eliminates the need for fossil fuels, burning or steam-generation equipment, atomic energy powered equipment and water-holding equipment such as dams, water holding ponds, and the like. Hence, the system has minimal impact, if any, upon the environment or upon the sanitary sewer distribution or treatment systems.

The foregoing describes, schematically, a preferred embodiment of the system and method of operation. Thus, having fully described at least one operative embodiment, it should be understood that the invention herein may be further developed within the scope of the following claims.

Hence, I claim:

1. A waste water electrical power generating system for installation in association with a waste water pipeline through which waste water flows by gravity, comprising:
   at least one electrical power generator; and
   driving means coupled to drive the at least one electrical power generator in response to the waste water flow;
   a diversion system, coupled to the waste water pipeline, for diverting solid materials present in the waste water away from the driving means;
   wherein electrical power is generated in response to the waste water flow and wherein the electrical power generator is selectively coupled to an electrical power transmission system to supply the electric power to the electrical power transmission system during periods of peak demand of the electrical power transmission system.

2. The waste water electrical power generating system of claim 1 wherein the driving means includes a turbine.

3. The waste water electrical power generating system of claim 1 wherein the driving means includes a water wheel.

4. A waste water electrical power generating method for use in association with a waste water pipeline through which waste water flows by gravity, comprising:

driving, via a driver, at least one electrical power generator in response to the waste water flow to generate electrical power in response to the waste water flow;
diverting solid materials present in the waste water away from the driver; and
selectively coupling the at least one electrical power generator to an electrical power transmission system during periods of peak demand of the electrical power transmission system to supply the electric power to the electrical power transmission system.

5. The method of claim 4 wherein driving the at least one electrical power generator includes a driving via a turbine.

6. The method of claim 4 wherein driving the at least one electrical power generator includes a driving via a waterwheel.

7. A method for selectively generating electrical power by using waste water gravity flow to generate electrical power, the method comprising:
   diverting at least some of the waste water flowing by gravity through a waste water pipe into and through a diversion pipe and back into a waste water pipe;
   straining the waste water flowing from the waste water pipeline into the diversion pipe; and
   driving an electrical power generator for generating electrical power in response to the waste water flowing through the diversion pipe.

8. The method of claim 7 wherein the step of driving the electrical power generator includes driving a turbine coupled to the electrical power generator by the flow of the waste water through the diversion pipe.

9. The method of claim 7 wherein the step of driving the electrical power generator includes driving a water wheel coupled to the electrical power generator by the flow of the waste water through the diversion pipe.

10. The method of claim 7 further comprising:
    regulating the volume of waste water flowing through the diversion pipe.

11. The method of claim 7 wherein the diversion pipe includes inlet and outlet ends, the method further comprising:
    controlling the volume of flowing waste water diverted from the waste water pipe through the diversion pipe inlet and outlet ends.

12. The method of claim 7 further comprising:
    distributing the electrical power into electrical power transmission lines.

13. The method of claim 7 further comprising:
    selectively distributing the electrical power into electrical power transmission lines.

\* \* \* \* \*